United States Patent [19]
Dougal

[11] Patent Number: 5,110,095
[45] Date of Patent: May 5, 1992

[54] SPACER BLOCKS FOR PIPE BEVELING AND/OR WELDING MACHINE

[75] Inventor: Patrick R. Dougal, Tulsa, Okla.

[73] Assignee: H & M Pipe Beveling Machine Company, Inc., Tulsa, Okla.

[21] Appl. No.: 642,459

[22] Filed: Jan. 17, 1991

[51] Int. Cl.$^5$ .............................................. B23K 7/00
[52] U.S. Cl. ........................................ 266/55; 266/54
[58] Field of Search ............... 266/48, 54, 56, 68, 266/76; 248/670, 678

[56] References Cited

U.S. PATENT DOCUMENTS

| 2,517,510 | 8/1950 | Singer | 248/678 |
| 4,414,041 | 11/1983 | Rusk | 266/54 |

FOREIGN PATENT DOCUMENTS 0695279 8/1953 United Kingdom ............... 266/54

Primary Examiner—Scott Kastler
Attorney, Agent, or Firm—William S. Dorman

[57] ABSTRACT

Spacers for supporting an arcuate saddle in concentric relation with respect to each of three specifically different sizes of pipe wherein a plurality of spacers are connected to the saddle and disposed radially between the saddle and one of the pipes, each spacer being a spacer having a width, length and height corresponding exactly to the three incremental spaces which are to be provided between the saddle and the three specifically different sizes of pipe, respectively, in order to achieve concentricity, all of the spacers being connectible to the saddle in a first orientation where the width dimension of the spacers is disposed radially between the saddle and a first size of pipe, all of the spacers being connectible to the saddle in a second orientation where the length dimension of the spacers is disposed radially between the saddle and a second size of pipe, all of the spacers being connectible to the saddle in a third orientation where the height dimension of the spacers is disposed radially between the saddle and a third size of pipe.

7 Claims, 4 Drawing Sheets

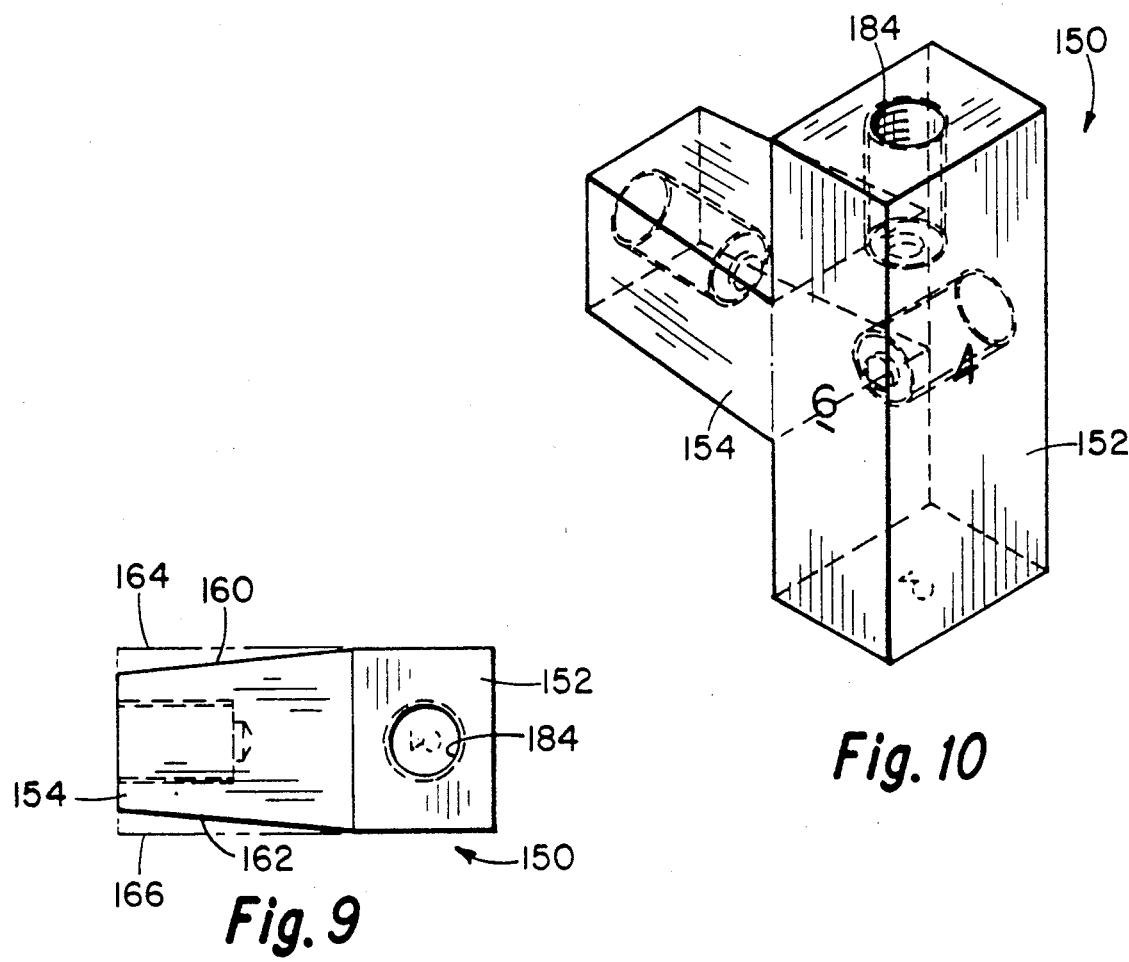
Fig. 10
Fig. 9
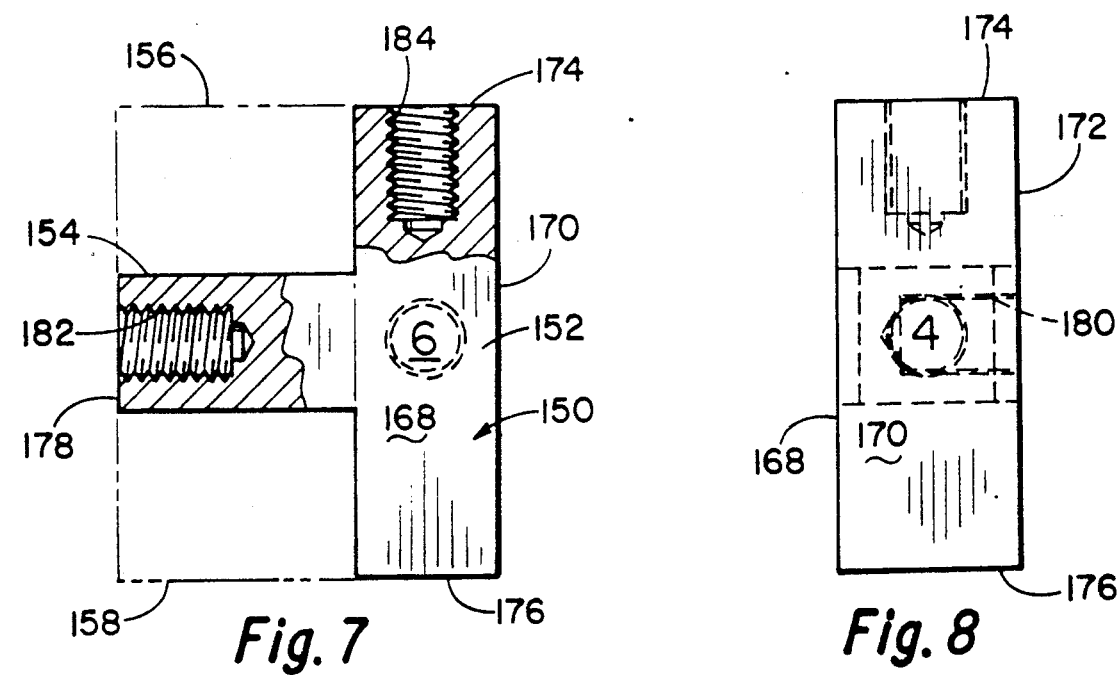
Fig. 7
Fig. 8

SPACER BLOCKS FOR PIPE BEVELING AND/OR WELDING MACHINE

CROSS-REFERENCE TO RELATED APPLICATIONS

This application is a continuation-in-part of prior co-pending application Ser. No 07/567,110 filed Aug. 13, 1990 (now abandoned).

BACKGROUND OF THE INVENTION

1. Field of Invention

The present invention relates to spacer blocks for a pipe beveling and/or welding machine. More particularly, this invention relates to spacer blocks which can be attached to the saddle for such a machine so that the welding, cutting or beveling instrument attached to the machine moves concentrically around the pipe.

2. The Prior Art

There are devices in the art which are adapted to weld, cut or bevel pipe by travelling around the circumference of the pipe. These devices are generally mounted on a saddle which may include a partial ring gear. The cutting, welding or beveling devices will either ride on or with the ring gear. For the sake of economy (in capital investment) a given saddle is generally adapted to work in conjunction with two or more sizes of pipe. The adjustability of the saddle is generally accomplished by interposing spacer elements between the saddle and the pipe.

One method of spacing, used in the prior art, involves the use of four spacer rods which are attached to the saddle by means of screws or bolts. The four rods would be of a certain length for a 4-inch pipe, a different length for a 6-inch pipe, and a still different length (shorter) for an 8-inch pipe. Thus, a person who wanted to accommodate his saddle for the three different sizes of pipe referred to above would have to keep three sets of rods, or a total of twelve rods, at all times. In the past, users have experienced problems in the loss or misplacement of these rods.

A preliminary search was conducted on the above invention and the following U.S. Patents were uncovered in the search:

| Inventor | U.S. Pat. No. | Issue date |
| --- | --- | --- |
| Singer | 2,517,510 | August 1, 1950 |
| Sherer et al | 4,007,705 | February 15, 1977 |
| Stubbings | 4,051,342 | September 27, 1977 |
| Slavens et al | 4,260,869 | April 7, 1981 |

None of the above patents are deemed to be of sufficient pertinence to require any comment, except for the Singer Patent 2,517,510.

The Singer U.S. Pat. No. 2,517,510 shows an adding machine stand wherein a bar 11 can be held in position on a board 4 by means of pins !5 which extend through holes 12 in the bar 11 and into holes 18 on the board 4. Note that the bar 11 can be variably positioned on the board 4 because there are a plurality of spaced holes 18 on the board. The bar 11 is used to hold an adding machine 8 in position on the stand 1. As shown in FIG. 2, the forward edge of the board 4 is behind the front leg 10 of the adding machine 8 and the bar 11 is in front of the rear leg 9 of the adding machine 8. Thus, depending upon the distance between the front and rear legs of the adding machine, the bar 11 can be positioned to accommodate this distance.

FIG. 7 of the Singer patent shows an arrangement wherein the bar 11 is pivoted 90 degrees and the pin 15 is inserted through a hole 16 which is transverse with respect to the original hole 12. This arrangement will elevate the rear of the adding machine to a higher position in the event that the adding machine is provided with an oil pan which will then be positioned between the spaced arms 14 of the bar 11.

Although the Singer patent was located in an extensive search of the art, it is not believed that the man skilled in the pipe beveling art would even be looking at the Singer patent as it comes from a totally unrelated art.

SUMMARY OF THE INVENTION

A spacer block to be attached to the cross members of a saddle for a pipe beveling and/or cutting machine to maintain the overall device in concentric relation with the pipe upon which the device is performing a cutting, welding or beveling operation. The spacer is a cuboid having a width, length and height corresponding exactly to the three incremental spaces which are to be provided between the saddle and the pipe for three specifically different sizes of pipe.

The cuboid of the present invention is provided with three threaded holes which permit attachment of the spacer to the cross members (or flats on the cross members) of the saddle. These three holes are parallel with the directions of the thickness, width and height of the cuboid, respectively. In a modified form of the invention, the corners of the cuboid are cut away to provide a "T"-shaped spacer.

BRIEF DESCRIPTION OF THE DRAWINGS

FIG. 7 is a front elevation, partly in section, of a modified form of the spacer shown in FIG. 3;

FIG. 8 is a right side elevation taken from FIG. 7;

FIG. 9 is a plan view of the spacer shown in FIG. 7; and

FIG. 10 is an isometric of the spacer shown in FIG. 7.

DETAILED DESCRIPTION OF THE PREFERRED EMBODIMENTS

Figure 1:
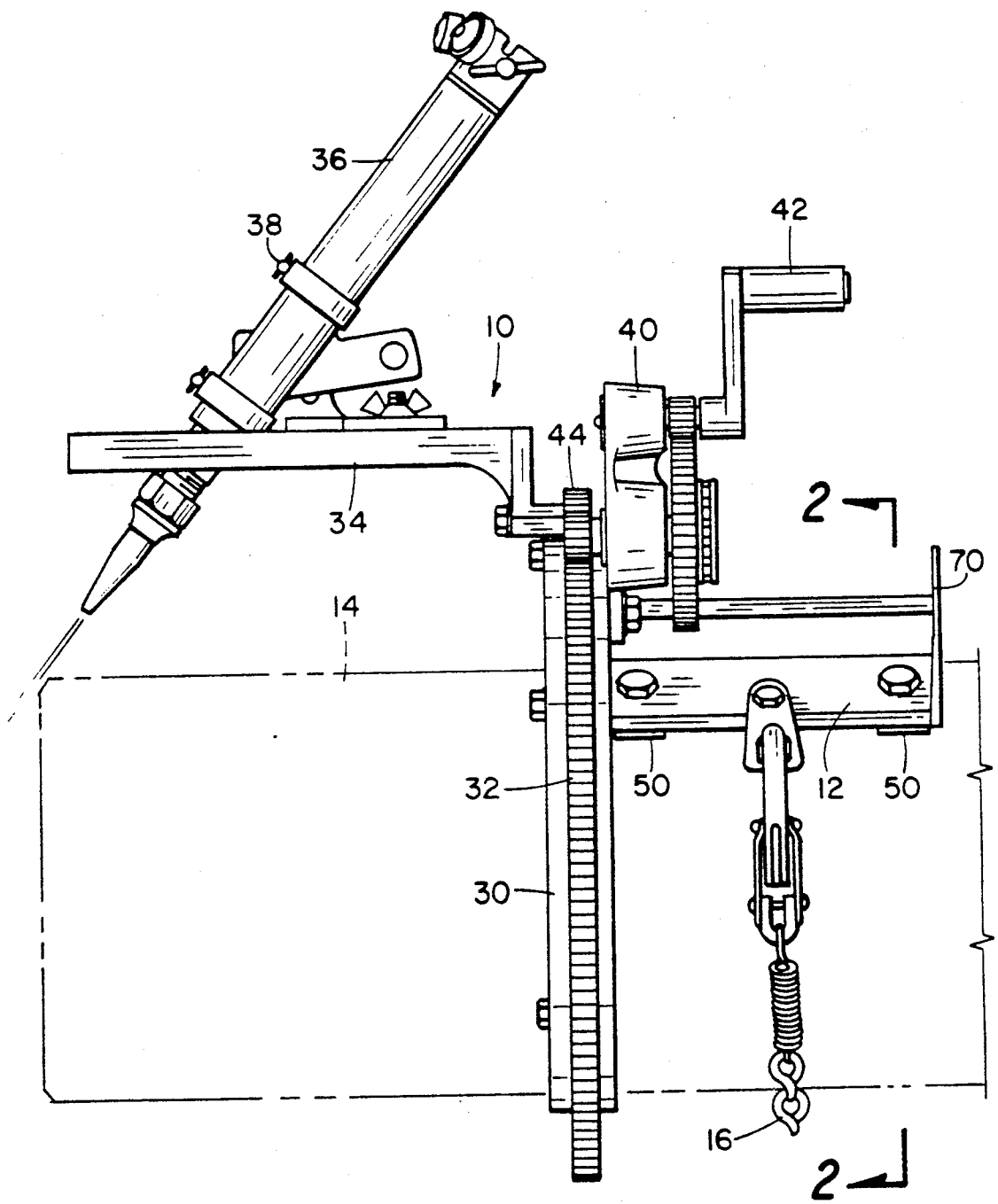
FIG. 1 is a side elevation of the type of pipe beveling and/or cutting machine which employs a torch that is directed towards the pipe, the latter appearing in phantom.

Referring to the drawings in detail, FIG. shows a conventional pipe cutting and/or beveling machine 10 to which the spacers 50 (later to be described) of the present invention are attached. Briefly stated, the machine 10 includes an arcuate saddle 12 which is adapted to rest on top of a pipe 14. The saddle 12 is held in a fixed position on the pipe by means of a chain 16 which is secured at one end to a loop or eye 18 on one side of the saddle. The other end of the saddle connects with a spring 20 which, in turn, connects with an adjustable latching device 22. The latter device is provided with a hook 24 which is received in another eye or loop 26 on the opposite side of the saddle 12 from the loop 18. A pivotal handle 28 on the latching device 22 permits a conventional tightening of the chain 16 around the bottom of the pipe 14 by extending the spring 20 through an inherent operating feature of the locking mechanism, the details of which have nothing to do with the present invention.

An arcuate ring support 30 is also affixed to the saddle 12 and a rotatable ring gear 32 is received in a recess in the ring support 30 for rotation around the pipe. A tool support 34 is attached to the ring gear 32 at the top center thereof so as to be moveable therewith as the ring gear 32 turns around the pipe 14. The tool support 34 is capable of supporting various types of tools for cutting, grinding, etc. As shown in FIG. 1, however, the tool support 34 carries a torch 36 attached to a torch holder 38 which is fastened to the tool support 34. A gear assembly 40 is connected to the ring support 30. The gear assembly 40 is considered to be conventional and forms no part of the invention. Suffice it to say, the gear assembly also includes a rotatable handle 42 which, through the various gears and chain shown, drives a small planetary gear 44 which engages the outer teeth of the ring gear 32. Thus, turning the handle 42 will cause the ring gear 32 to turn around the pipe while simultaneously rotating the torch around the pipe.

Figure 2:
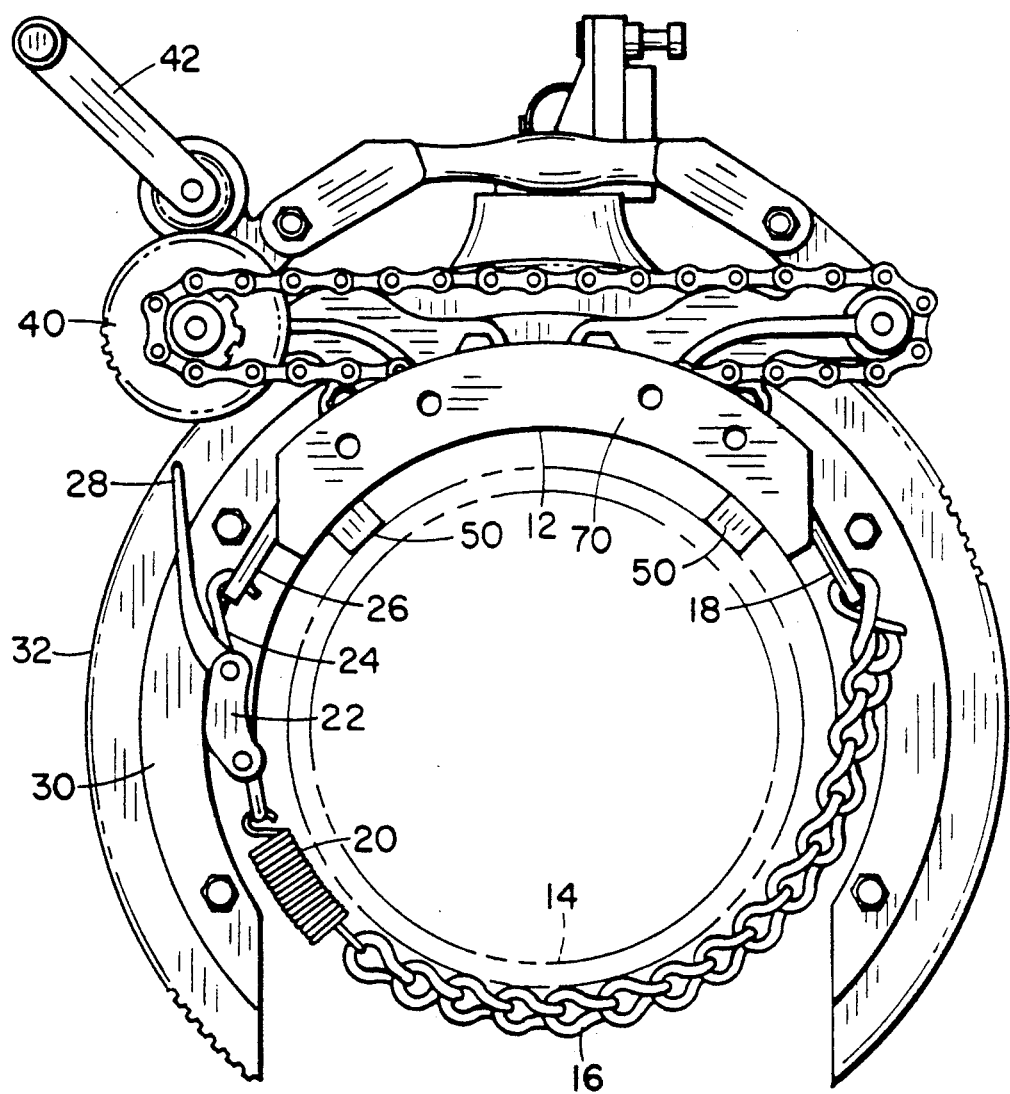
FIG. 2 is a sectional view taken along section line 2—2 of FIG. 1 with the torch being omitted.

In order for the pipe cutting or beveling to be successful, it is essential that the saddle and the ring gear 32 be concentric with the center line of the pipe 14. On the other hand, it is not economically feasible to provide a separate individual pipe cutting and/or beveling machine for each individual size of pipe. Although the pipe cutting and/or beveling machine generally illustrated in FIGS. 1 and 2 is provided in several different sizes, each size of machine is adapted, by the use of spacers, to operate on a plurality of different sizes of pipe within a given range of sizes consistent with the size of the pipe cutting and/or beveling machine.

In order to utilize a given pipe beveling machine, such as the device 10, on a number of different sizes of pipe it has been the practice in the past to provide the saddle 12 with spacers of precise but varying lengths which project radially inwardly from the saddle 12 and which bear against the outer surface of the pipe. The spacers commonly used in the past have consisted of tubes or sleeves of predetermined lengths which are attached to, or received on, bolts or other supporting members which project radially inwardly towards the pipe.

Figure 3:
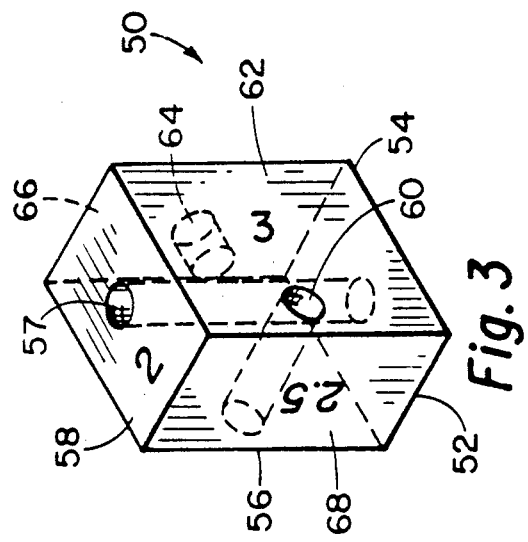
FIG. 3 is an isometric view of the spacer of the present invention.

As best shown in FIG. 3, the spacer 50 of the present invention is in the shape of a rectangular parallelepiped or cuboid. For reference purposes, the cuboid 50 is considered having a width I5 52, a length 54 and a height 56, these numerals being applied to the edges representing width, length and height. Obviously, the width 52 is less than the length 54 and the length 54 is less than the height 56.

The cuboid 50 is provided with a threaded hole 57 which extends downwardly from the top face 58 through the cuboid to the bottom face. A second hole 60 extends horizontally rearwardly from the front face 62 of the cuboid to the rear face thereof. A third threaded hole 64, shown in dotted lines, extends laterally from the hidden side face 66 part-way towards the other side face 68. The purpose of these threaded holes will be described hereinafter.

The saddle itself is provided with an arcuate end member 70 which is vertically disposed and parallel with the ring support 30. The arcuate end member 70 connects with the ring support 30 by means of three longitudinal cross members 72, 74 and 76 which are essentially rectangular in cross section. Whereas the cross members 72, 74 and 76 are necessary to provide rigidity for the saddle 12, the cross member 72 and 76 provide an additional function in that they support the spacers of the present invention.

Figure 4:
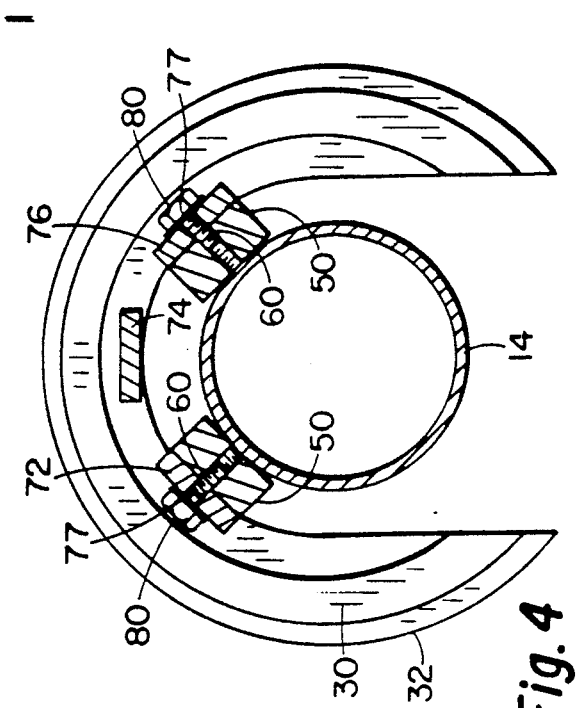
FIG. 4 is a sectional view, broadly similar to FIG. 2, showing only pertinent portions of the pipe beveling machine but showing, in cross section, the relationship between the cross members of the saddle, the spacer elements of the present invention and a pipe of a given size.
Figure 5:
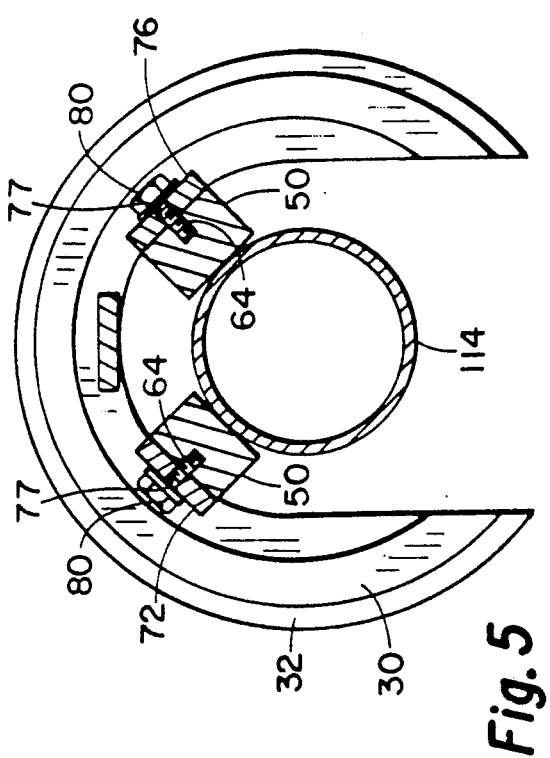
FIG. 5 is a view similar to FIG. 4 showing the orientation of the spacers of the present invention for a slightly smaller size of pipe.

Referring now to FIG. 4, the pipe 14 shown in this figure is the same pipe 14 in FIG. 1 which is a nominal 3 inch pipe. FIG. 5, however, shows a pipe 114 which is a nominal 2½ inch pipe, and FIG. 6 shows a pipe 214 which is a nominal 2 inch pipe.

Referring again to FIG. 4, which includes the largest diameter pipe 114 of the three examples set forth herein, the spacers 50 are attached to the cross members 72 and 76 utilizing the minimum dimension of the spacer 50. Four threaded bolts 80, 80, etc., (two bolts for each cross member 72 and 76) are employed to hold the spacer 50 against the cross members 72 and 76. Thus, the bolts 80 in FIG. 4 pass into the holes 60 in the spacers 50. As indicated previously, the hole 60 extends all the way through the block from the front face to the rear face thereof. The user will insert the bolt 80 through the holes 77 in the cross members and into the hole 60 from the rear face of the cuboid so that the opposite face 62 will be directed downwardly towards the pipe 14. For the sake of convenience, the numeral "3" is stamped into the face 62. After the user applies all four cuboids or spacers 50, if he has attached the spacer correctly, the numeral "3" will be facing downwardly towards the pipe on all four spacers.

Turning now to FIG. 5, the spacer 50 is attached to the cross members 72 and 76 by inserting the bolts 80 through the holes 77 in the cross members and into the holes 64 which extend part way into the block from the hidden face 66. The numeral "2.5" appears on the face 68 opposite from the hidden face 66. Thus, if the user has attached all the spacers correctly for a 2½ inch pipe, the numeral "2.5" will be readily visible on the exposed ends of the spacers which face downwardly towards the pipe 114.

Figure 6:
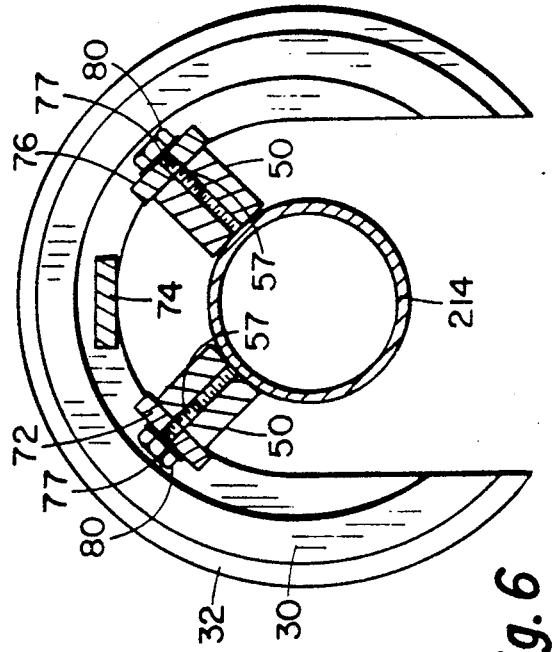
FIG. 6 is a view similar to FIG. 5 showing the orientation of the spacers of the present invention for a still smaller size of pipe.

Turning now to FIG. 6, the same general considerations hold true with respect to the attaching of the spacers 50 to the cross members 72 and 76. In this case, however, the bolts 80 are inserted through the holes 77 in the cross members and into the holes 57 through the bottom sides of the spacers as the same appears in FIG. 3. The number "2" will appear on the lower exposed ends of the spacer 50 corresponding to the 2 inch nominal size of the pipe 214 shown in FIG. 6.

The width 52 of the spacer or cuboid 50 is such that the saddle 12 and the planetary gear 32 are concentric with the pipe 14 shown in FIG. 4. Similarly, the length 54 of the cuboid 50 is such that the saddle is concentric with the pipe 114 shown in FIG. 5. Lastly, the vertical height 56 of the cuboid 50 shown in FIG. 3 is such that the saddle is concentric with the pipe 214 shown in FIG. 6. If one were using the device shown in FIGS. 1 and 2 in connection with a 3-inch pipe, for example, and wished to use it instead on a 2-inch pipe (such as shown in FIG. 6) he would merely loosen the bolts 80, remove the spacers 50 and thereafter reinsert the bolts into the holes 57 as described above. There is no need to add spacer elements or to subtract spacer elements when changing from one pipe size to another. Thus, there are no parts to be lost or misplaced. All four spacers or cuboids will be mounted to the saddle 12 at all times, albeit in possibly different positions.

Referring now to FIGS. 7 through 10, these figures show a spacer 150, which is a modified form of the spacer 50 shown in FIG. 3. Whereas spacer 50 has been described previously as a "cuboid", the spacer 150 is a modified form of cuboid with two corner sections cut away. For example, FIG. 7 shows a spacer 150 which is shaped in the form of a "T" (lying on its side); the portion 152, which is vertically disposed in FIG. 7, represents what would normally be considered as the top arm of the "T". The portion 154, which is actually horizontally disposed in FIG. 7, represents the (normally vertical) leg of the "T" and is at right angles to the center of the arm 152. If the spaces on opposite sides (above and below) of the leg 154, to the left of the arm 152, were filled in, as shown by the dot and dash lines 156 and 158, the spacer 150 in FIG. 7 would also be a "cuboid". However, it was discovered that the advantages of the cuboid shown in FIG. 3 could be utilized (height, length and width dimensions) but the corners could be cut away to decrease the weight of the spacer.

As shown in FIG. 9, the leg 154 is tapered to eliminate still further material from the ultimate spacer block. Thus, the arm 154 is formed by two faces 160 and 162 which taper convergingly towards each other starting from where the leg 154 connects with the arm 152 and terminating at the left hand side as shown in FIG. 9. The dot and dash lines 164 and 166 represent the portions which have been cut away from the true cuboid form of the spacer.

To complete the "cuboid" comparison, the arm 152 has a front surface 168, a right side surface 170, and a rear surface 172. The arm 152 also has a top surface 174 and a bottom surface 176. The left hand end of the leg 154 has a vertical surface 178. If the surfaces 168, 172, 174 and 176 were extended to the left (in relation to FIG. 7), and if the vertical surface 178 were at the same time extended upwardly and downwardly, these surfaces would intersect to form a cuboid together with the surface 170.

A threaded hole 180 is drilled into the vertical surface 172 at right angles thereto so as to extend in the "width" direction. Another hole 182 is drilled into the surface 178 at right angles thereto representing the "length" direction. A third hole 184 is drilled into the surface 174 at right angles thereto representing the "height" direction.

The pipe beveling machine 10 specifically shown in FIGS. 1 and 2 is illustrative of a pipe beveling and/or cutting machine which exists in several different sizes, each size being adapted to operate with a different range of sizes of pipe.

The spacer 50 has been designed for use in conjunction with a smaller size model of pipe beveling machine adapted to operate with nominal 2 inch, 2½ inch and 3 inch pipe; without the spacers the cross members 72 and 76 would permit the saddle to rest on a 4 inch pipe. Again, it must be emphasized that this invention is dealing with "nominal" pipe sizes whereas the actual size of the pipe is generally somewhat larger than the nominal size. Therefore, the dimensions of the spacer 50 are correlated with the differences in the nominal pipe sizes. The spacer 50 has an actual width dimension of ½ inch, an actual length dimension of 13/16 inch and a height dimension of 1-1/16 inch.

Returning to a further consideration of FIGS. 7 through 10, the width dimension (between the surfaces 168 and 172) is 1.0 inch, the length dimension (from the surface 170 to the surface 182) is 2-1/16 inch and the height dimension (between the surface 174 and 176) is 2-9/16 inch. The spacer 150 is designed for use in conjunction with a larger size of pipe beveling and/or cutting machine than that described in relation to spacer 50. Since the spacer 150 is physically larger than the spacer 50 shown in FIG. 3, the elimination of the portions of "cuboid" on the opposite sides of the leg of the "T" represent a more substantial savings in weight and material than would be the case in connection with the spacer 50 in FIG. 3. However, the spacer in FIG. 3 could also be modified, if the hole 57 were moved closer to the surface 168, so as to cut out the corners and resemble the "T" shaped spacer of FIGS. 7 through The spacer shown in FIGS. 7 through 10, when used with a larger machine, will permit the machine to be used, for example, on nominal 3 inch, 4 inch and 6 inch pipe with the spacers 150. The spacer 150 will be positioned on the cross members 172 and 176 on the saddle 12 in essentially the manner as the spacer 50 shown in FIGS. 4, 5 and 6. Using the larger machine, the bolts 80 will be inserted in the holes 180 of four spacers 150 for a 6 inch nominal pipe. For a 4 inch nominal pipe, the bolts 80 will be inserted in the four holes 182 of the four spacers 150. For a 3 inch nominal pipe, the four bolts 80 will be inserted in the four holes 184 in the spacers 150. With no spacers at all, the saddle of this larger machine would accommodate an 8 inch nominal pipe. FIGS. 7 to 10 show numerals 3, 4 and 6 on the faces 176, 170 and 168, respectively, for indicating that the spacer 150 is designed for use in connection with the foregoing nominal pipe sizes. The numerals, which would be stamped in the surfaces indicated, would face downwardly towards the pipe upon which the machine is to be mounted.

The same spacer 150 shown in FIGS. 7 through 10 can also be used on a somewhat larger machine using the identical dimensions of the spacer 150. In case the spacer 150 were to be used in conjunction with the second larger machine, the stamped numerals 3, 4 and 6 would be replaced with stamped numerals 7, 8 and 10, for example. As such, the spacer 150 would accommodate nominal pipe sizes of 7 inch, 8 inch and 10 inch, respectively, with this second larger machine. Without any spacer, the saddle of this second larger machine could rest on a 12 inch pipe.

Summarizing, the spacer of the present invention is defined by a first pair of parallel planes spaced apart a distance equal to the width distance, a second pair of parallel planes spaced apart a distance equal to the length distance and perpendicular to both the first pairs of planes, and a third pair of parallel planes spaced apart a distance equal to the height distance and perpendicular to the first and second pair of parallel planes. The spacers which are specifically described and illustrated in the drawings fall within the confines of the three pair of planes defined above. In the case of FIG. 3, the spacer 50 is conterminous with the three pairs of planes. The spacer shown in FIGS. 7 to 10, while being cut away at the corners to form the resulting "T", still falls within, and is defined by, the three pairs of planes. Although the leg 154 of the "T" 150 is shown as being perpendicular to the arm 170 at the center thereof, obviously the leg could be offset from the center of the arm as desired.

Whereas the present invention has been described in particular relation to the drawings attached hereto, it should be understood that other and further modifications, apart from those shown or suggested herein, may be made within the spirit and scope of this invention. For example, the spacers are shown as having threaded holes therein for attachment to the cross members of the saddle; in lieu of the holes in the spacers, the latter could be provided with outwardly projecting threaded members positioned in essentially the same location as the existing threaded holes such that these threaded members could project through the holes in the cross members and be secured thereto by means of nuts which would be screwed onto the outer ends of these threaded members.

What is claimed is:

1. Spacers for supporting an arcuate saddle of a pipe beveling or welding machine in concentric relation, with respect to each of three specifically different sizes of pipe wherein a plurality of such spacers are connected to the saddle and are disposed radially between the saddle and one of the pipes, each spacer having a width, length and height corresponding exactly to the three incremental spaces which are to be provided between the saddle and the three specifically different sizes of pipe, respectively, in order to achieve concentricity, all of the spacers being connectible to the saddle in a first orientation where the width dimension of the spacers is disposed radially between the saddle and a first size of pipe, all of the spacers being connectible to the saddle in a second orientation where the length dimension of the spacers is disposed radially between the saddle and a second size of pipe, all of the spacers being connectible to the saddle in a third orientation where the height dimension of the spacers is disposed radially between the saddle and a third size of pipe.

2. Spacers as set forth in claim 1 wherein the saddle is provided with a plurality of longitudinal cross members having holes therein corresponding to positions of attachment of the spacers, each spacer having three threaded holes extending into the spacer in directions parallel to the width, length and height, respectively, of the spacer and a plurality of threaded bolts, one bolt being adapted to being inserted into each hole in the cross members and into a threaded hole in an associated spacer.

3. Spacers as set forth in claim 1 wherein each spacer is defined by a first pair of parallel planes spaced apart a distance equal to the width distance, a second pair of parallel planes spaced apart a distance equal to the length distance and disposed at right angles to the first pair of parallel planes, and a third pair of parallel planes spaced apart a distance equal to the height distance.

4. Spacers as set forth in claim 3 wherein each spacer constitutes a cuboid within the confines of the three pairs of planes.

5. Spacers as set forth in claim 4 wherein the saddle is provided with a plurality of longitudinal cross members having holes therein corresponding to positions of attachment of the spacers, each spacer having three threaded holes extending into the spacer in directions parallel to the width, length and height, respectively, of the spacer and a plurality of threaded bolts, one bolt being adapted to being inserted into each hole in the cross members and into a threaded hole in an associated spacer.

6. Spacers as set forth in claim 3 wherein each spacer is in the form of a "T" within the confines of the three pairs of planes.

7. Spacers as set forth in claim 6 wherein the saddle is provided with a plurality of longitudinal cross members having holes therein corresponding to positions of attachment of the spacers, each spacer having three threaded holes extending into the spacer in directions parallel to the width, length and height, respectively, of the spacer and a plurality of threaded bolts, one bolt being adapted to being inserted into each hole in the cross members and into a threaded hole in an associated spacer.

* * * * *